United States Patent [19]
Sutton et al.

[11] Patent Number: 5,913,179
[45] Date of Patent: *Jun. 15, 1999

[54] METHOD FOR SPATIAL AND TEMPORAL ANALYSIS OF NESTED GRAPHICAL DATA

[75] Inventors: Virginia Kay Sutton, Brandon; John Michael Nestler, Vicksburg, both of Miss.

[73] Assignee: The United States of America as represented by the Secretary of the Army Corps of Engineers, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,497

[22] Filed: May 30, 1996

Related U.S. Application Data

[63] Continuation-in-part of application No. 08/493,026, Jun. 21, 1995, Pat. No. 5,790,434.

[51] Int. Cl.⁶ .................................................. G06F 19/00
[52] U.S. Cl. ................................................................ 702/12
[58] Field of Search .................................... 364/420, 578; 395/929, 930, 931; 434/126, 150, 151, 299; 702/5, 2, 12, 11

[56] References Cited

U.S. PATENT DOCUMENTS

| | | | |
|---|---|---|---|
| 5,349,327 | 9/1994 | Waters | 340/540 |
| 5,483,500 | 1/1996 | Capell, Sr. et al. | 367/119 |
| 5,531,125 | 7/1996 | Ahn et al. | 73/861.27 |
| 5,568,450 | 10/1996 | Grande et al. | 367/131 |
| 5,653,592 | 8/1997 | Davinroy | 434/126 |

OTHER PUBLICATIONS

Charles Bostater et al., Remote Sensing of Physical and Biological Properties of Estuaries), Oceans '88: A Partnership of Marine Interests pp. 462–466.

Robert Haber, "Scientific Visualization and the Rivers Project at the National Center for Supercomputing Applications", Computer Magazine, vol. 22, Iss. 8, pp. 84–89, Aug. 1989.

Zobeida Cisneros et al., "Parametric Modelling and Estimation of Acoustic Sediment Properties Using a System Identification Approach", Ultrasonics, 1994 Symposium, vol. 2, pp. 659–664.

*Primary Examiner*—Donald E. McElheny, Jr.
*Attorney, Agent, or Firm*—Luther A. Marsh

[57] ABSTRACT

A computer implemented method for analyzing data utilizes a program and computer for processing input data in the form of a digitized map representing a physical structure. The microprocessor performs the steps and stores the results of the steps in an attached storage device. The computer is programed to employ or use various linear scales to establish critical dimensions of the curve and to analyze the dimensions in terms of orthogonal components. These are also stored for later processing or analysis to predict physical behavior associated with the structure. In a particular embodiment the curve represents a river bottom and predictions may be made about flows and the like.

15 Claims, 23 Drawing Sheets

θ = SUPPLEMENTARY ANGLE TO BAC

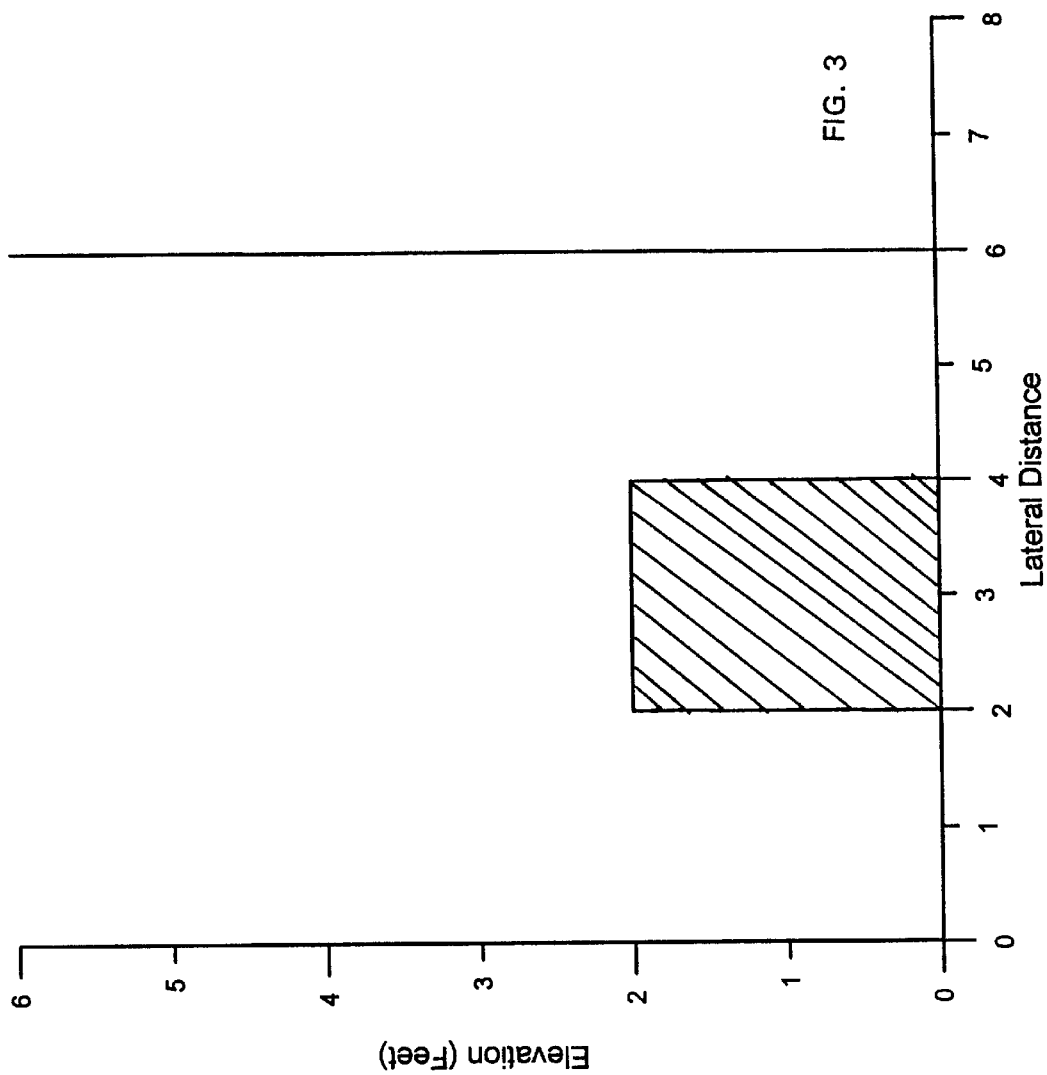

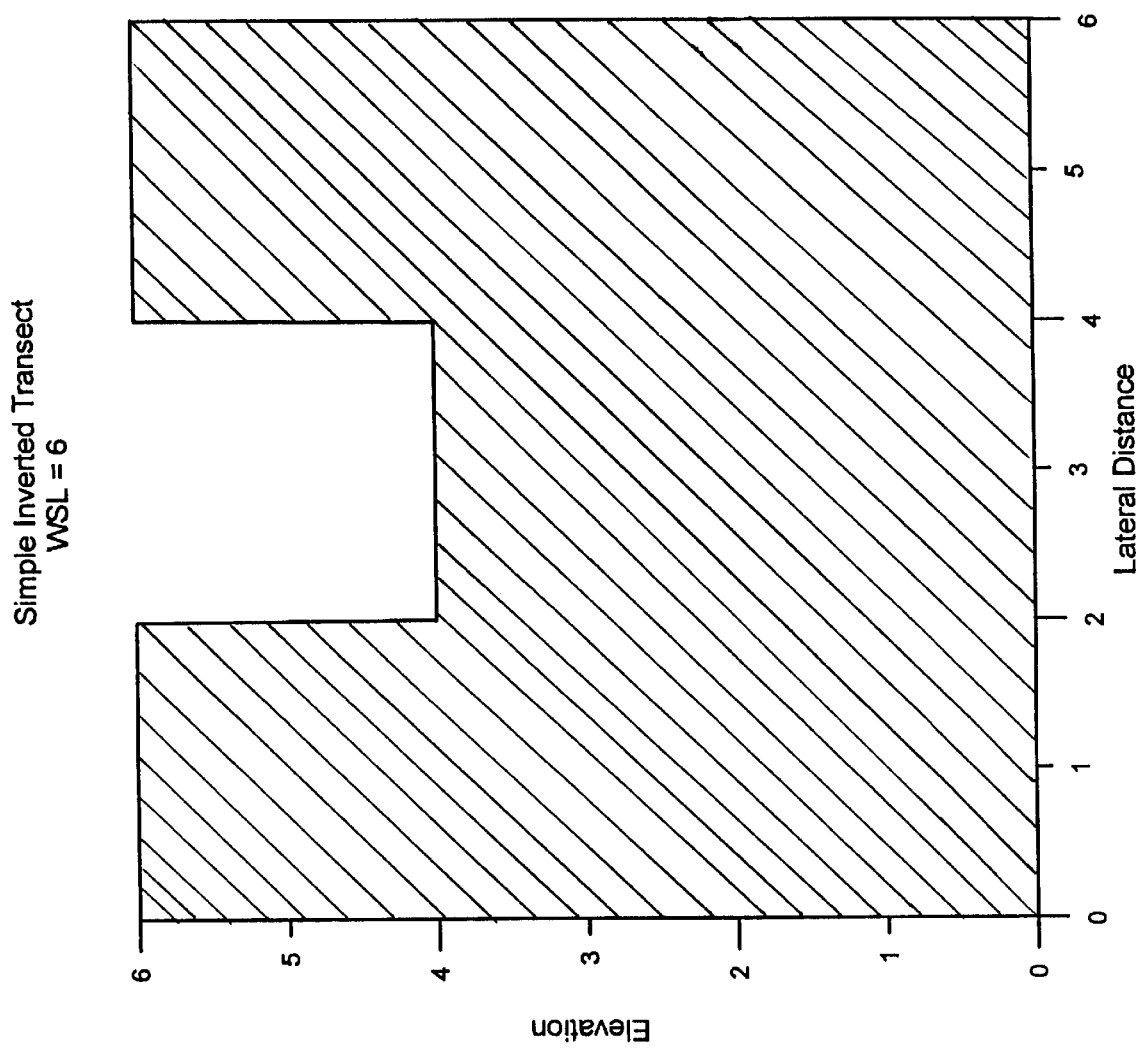

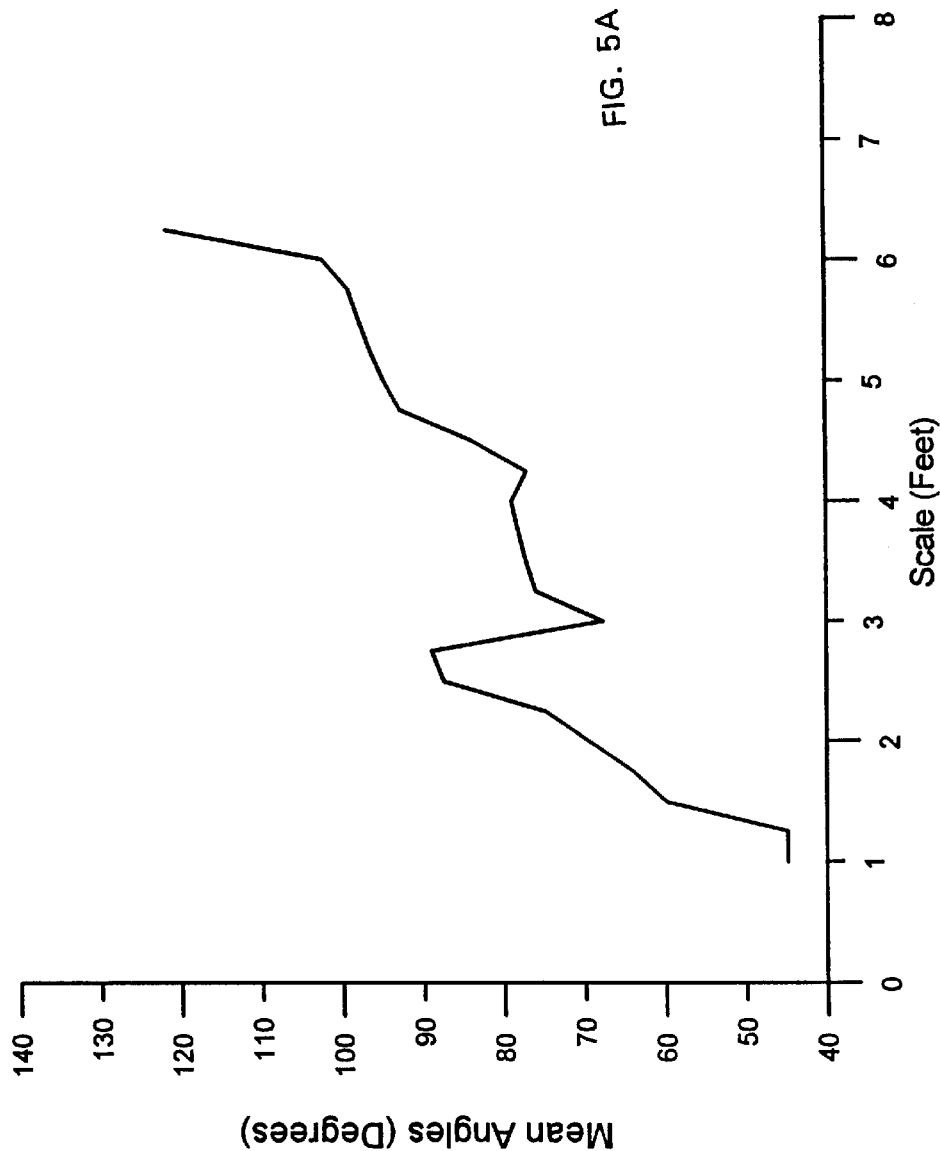

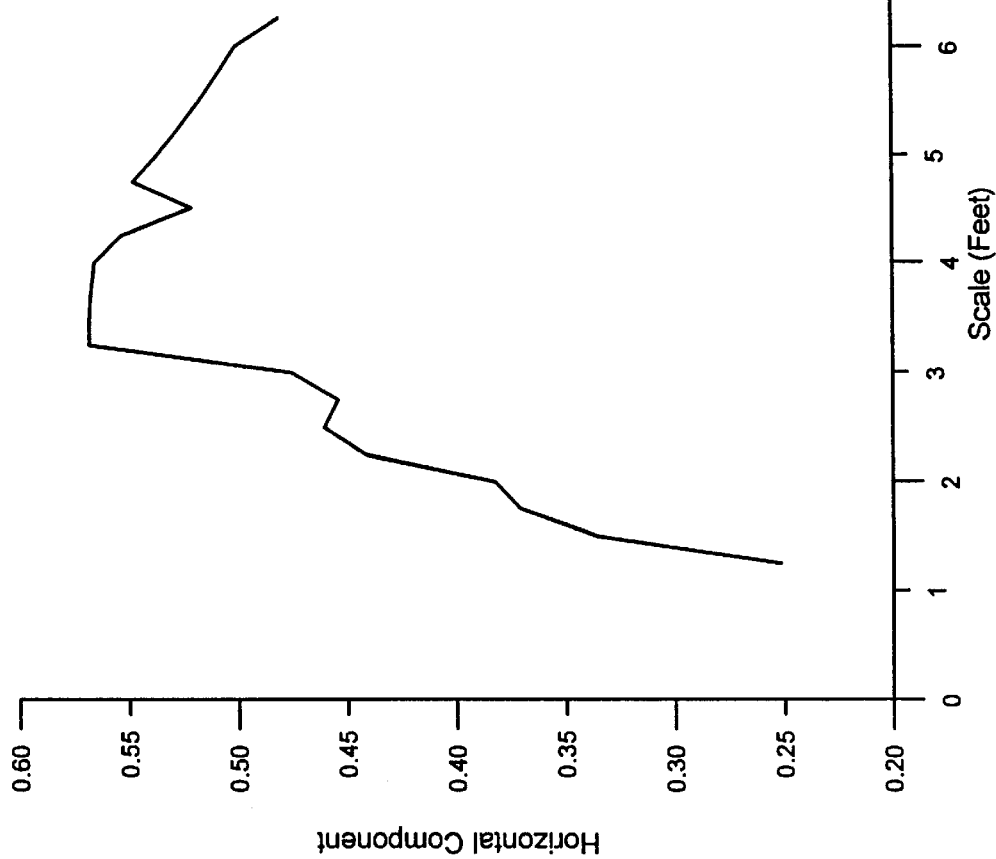

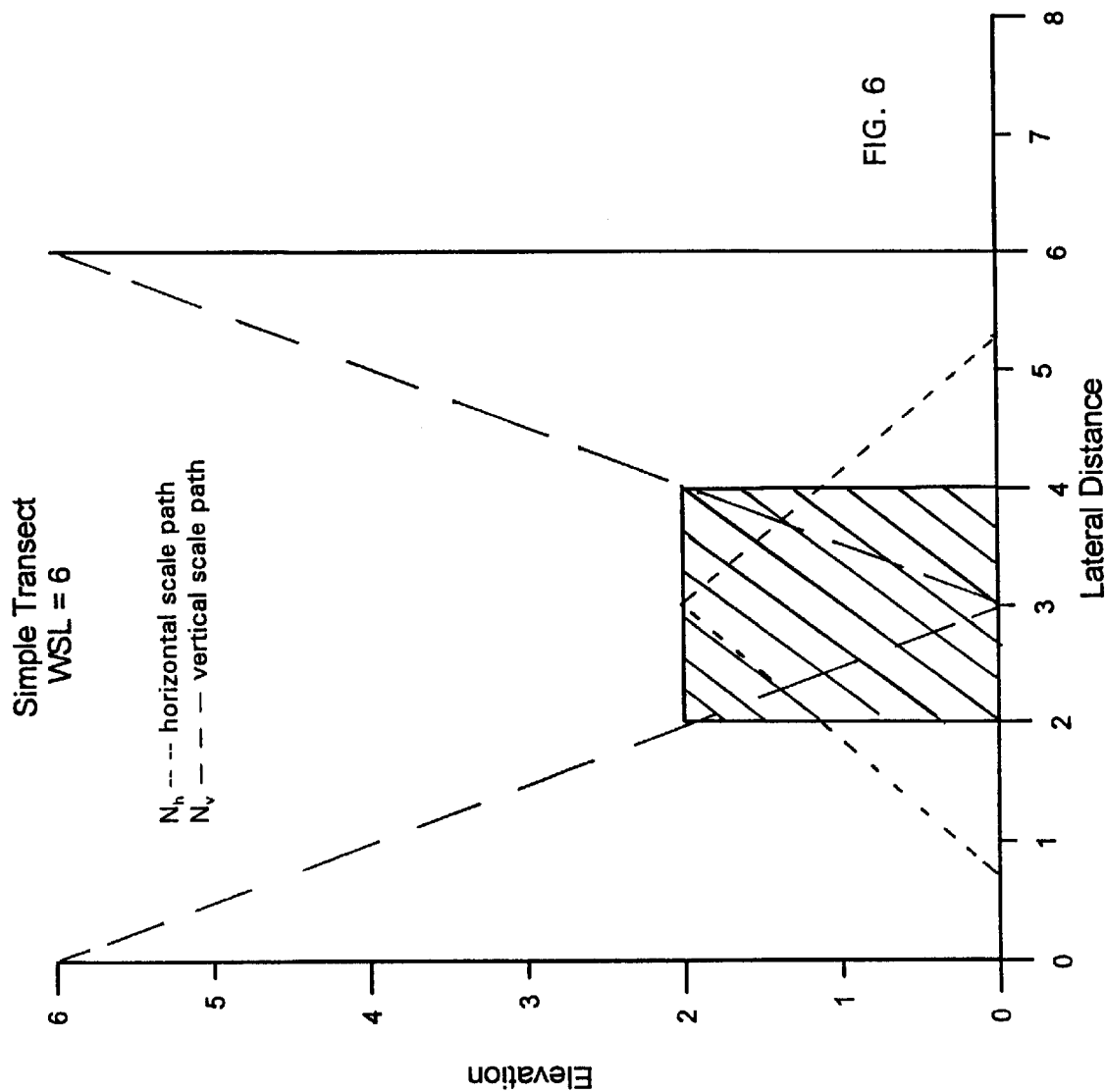

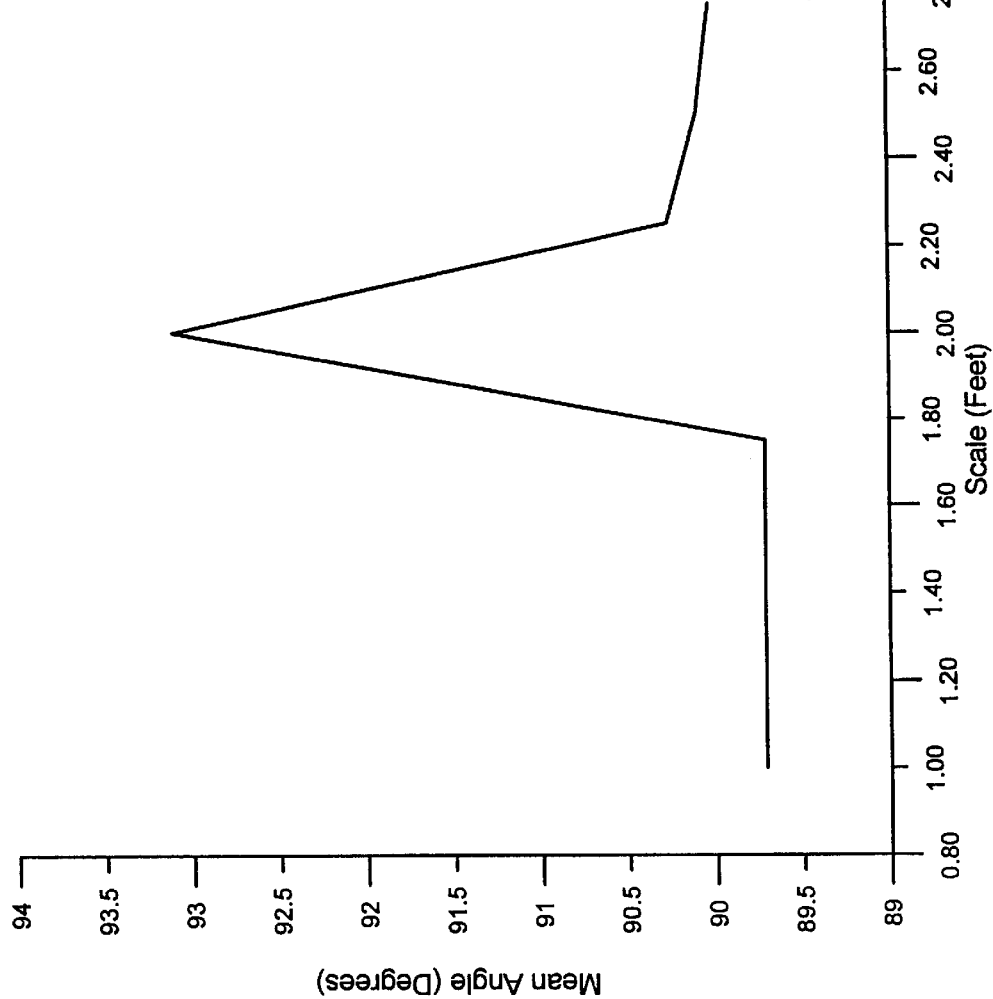

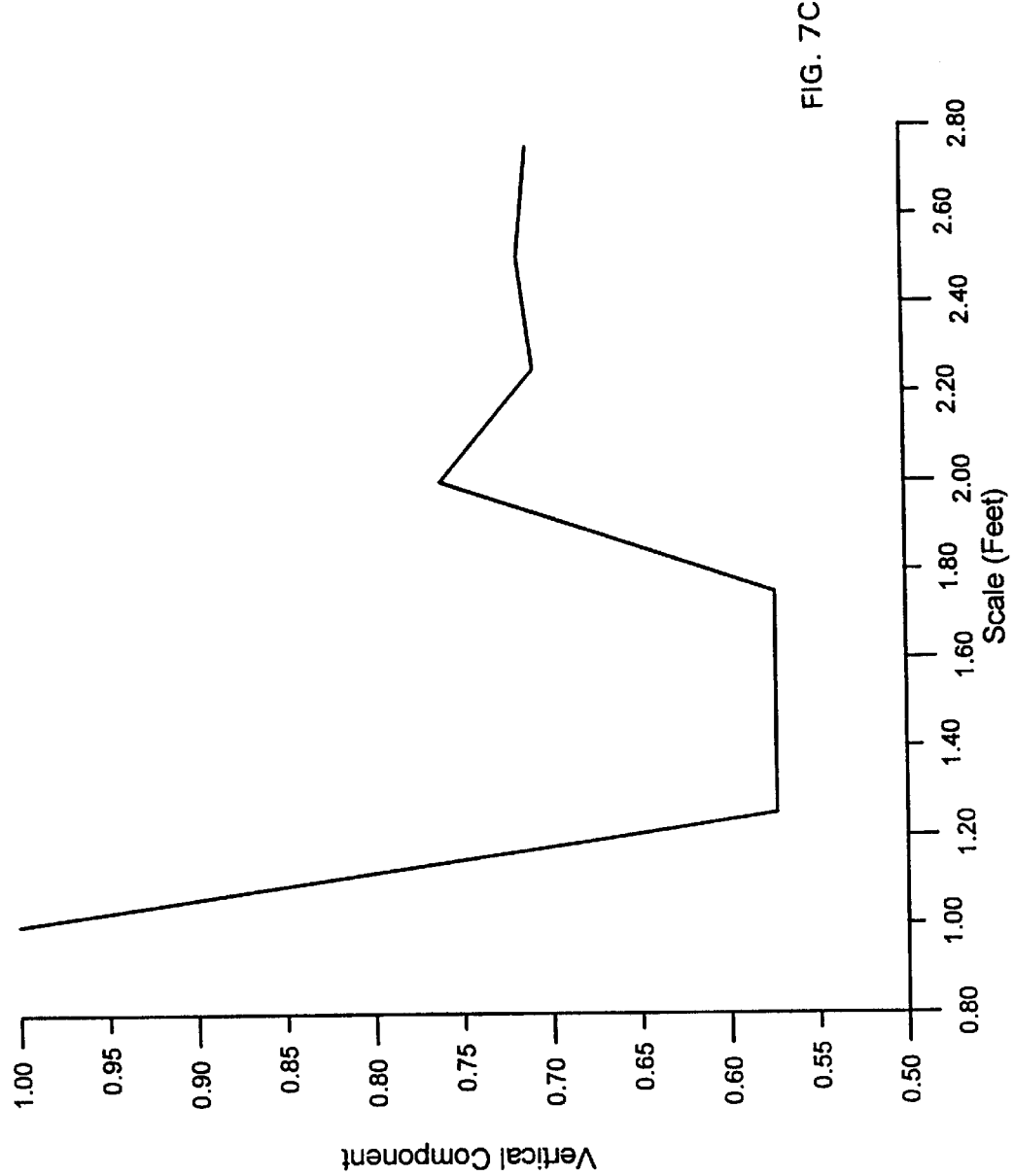

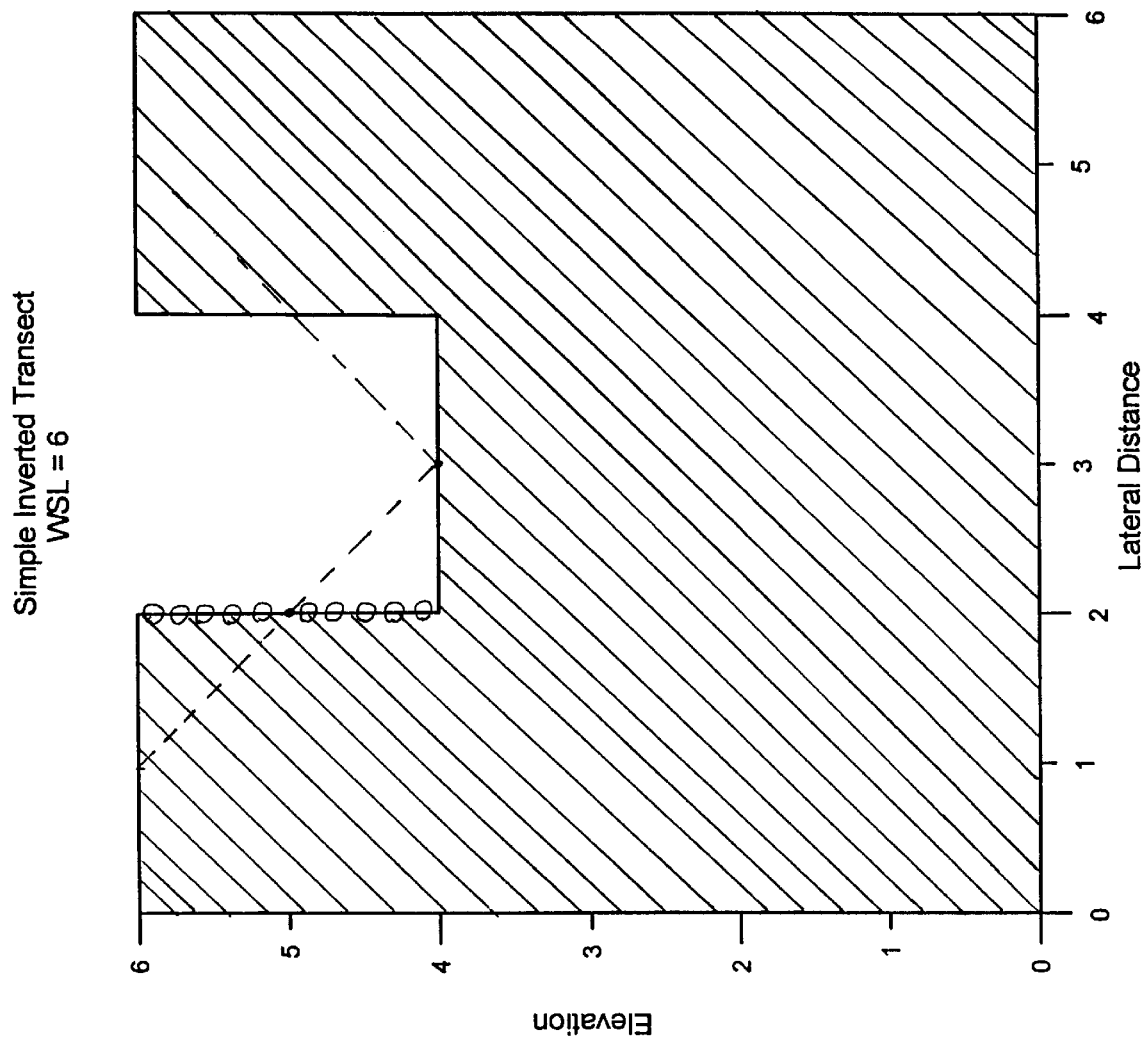

Cantor Set

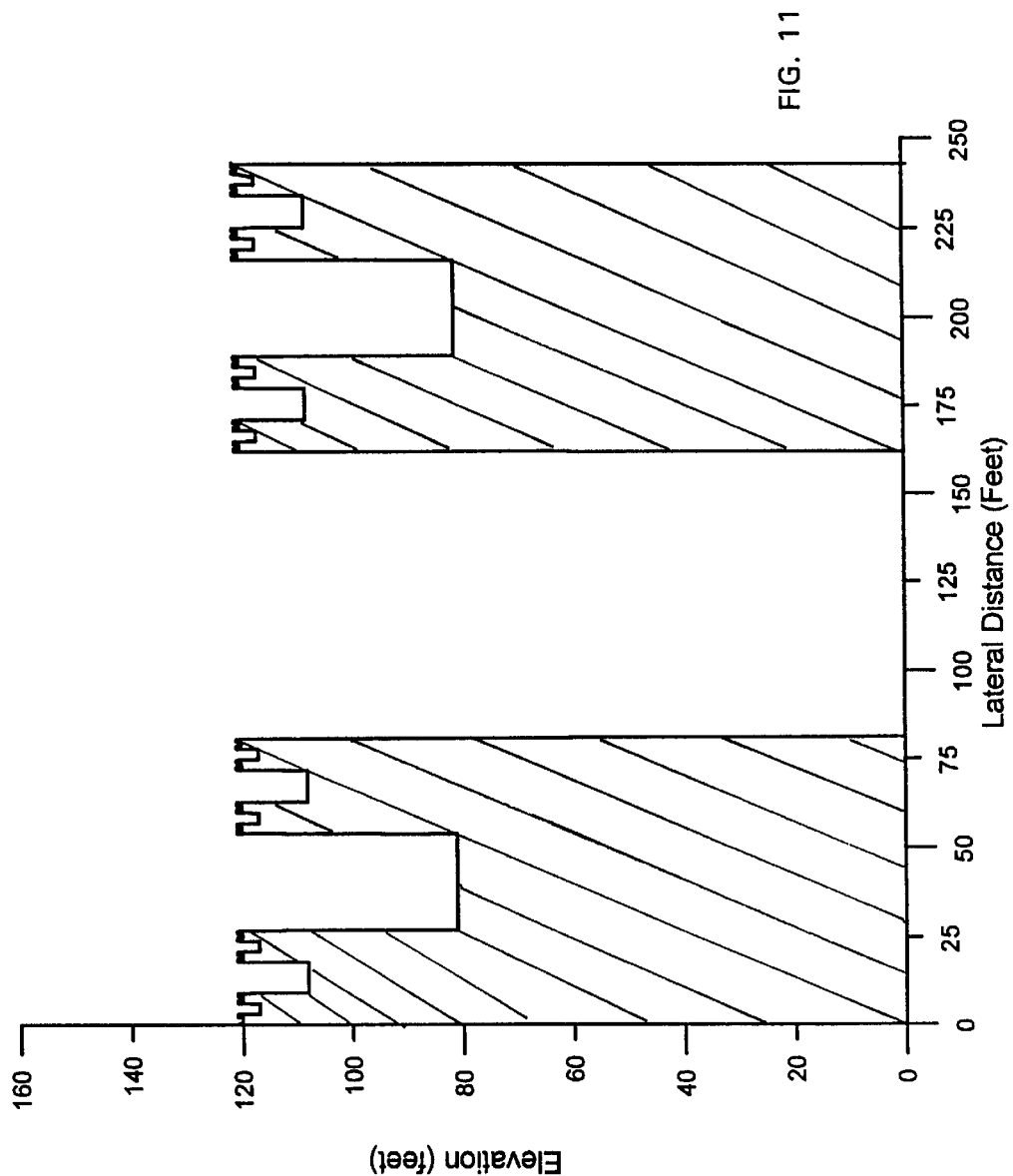

METHOD FOR SPATIAL AND TEMPORAL ANALYSIS OF NESTED GRAPHICAL DATA

CROSS REFERENCE TO RELATED APPLICATION

This application is a continuation-in-part of U.S. application Ser. No. 08/493,026, filed Jun. 21, 1995, U.S. Pat. No. 5,790,434.

STATEMENT OF GOVERNMENT INTEREST

The invention described herein may be manufactured and used by or for the Government of the United States of America for governmental purposes without the payment of any royalties thereon.

BACKGROUND OF THE INVENTION

The present invention relates to data analysis and in particular is directed to a method for spatial and temporal analysis of nested data for the purpose of deriving critical scales from the data which may be used to evaluate physical systems.

Various techniques for analyzing data are known. These techniques are used to look at data on various levels. For example, data may be analyzed using scales or measures of various sizes. Large scale measures may illustrate visible characteristics on a macroscopic level. Intermediate and small scale analysis may provide information about data which points to a characteristic or characteristics which would not necessarily be apparent. For example, large scale analysis may reveal major features and dimensions, such as, the largest transverse and vertical dimensions. Small scale analysis may provide a more accurate measure of the length of a curve, for example. Intermediate scale analysis may provide information as to the contour or changes in the contour of a curve or surface, which information may be correlated with other known information about such curve and thereby provide a method for categorizing various curves or surfaces in a way which reveals related physical characteristics.

In a physical system, such as a riverbed or channel, the bottom contour, depending upon its shape, may affect the flow and hence the ecology in a variety of ways. The effects may not be known or well understood without a fundamental understanding of the characteristics of the river contour or surface. Also, a comparison of similar river bottom profiles may reveal a common characteristic at one level but may yield an entirely different characteristic at another level, thereby answering questions about diverse behavior of such systems which are not otherwise explainable without deeper analysis.

Some systems measure the perimeter or length of a curve by using scales of reduced size. As the scale length decreases, the perimeter value increases to some limit. However, such measurement systems may have a bias because they begin measuring from the same starting point.

Angle measurements are employed as an alternative approach. Such angle measurements measure an included angle at a given point on the curve at that scale. The supplement of the included angle is a better measure inasmuch as it reveals the degree of change in the curve. The technique does not suffer from the starting point bias of the perimeter length measurement technique discussed above.

Some researchers in geomorphology have asserted that a landscape has characteristic or dominant scales. This is untrue for fractal objects which are defined as having no particular dominant scale at any level. Fractal theory also assumes that for a range of scales the complexity is constant. Thus, it has been difficult to use algorithms dedicated to calculating fractal dimensions for identifying characteristic scales in landscapes, for example, because standard fractal methods are too insensitive to separate dominant scales. Angle measuring has the ability to discern dominant scales unlike the perimeter length measuring technique.

It is therefore desirable to provide techniques for analyzing data by quantifying its nested structure without measurement bias. It is also desirable to derive from the data dominant scales in orthogonal directions in order to further reveal discernible characteristics.

SUMMARY OF THE INVENTION

The invention is based upon an elaboration of the discovery that angle measurements made at different scales by randomly selecting starting points for the various scales give more information than simply computing a fractal dimension alone (Robert Andrle, "The Angle Measure Technique: A new method for characterizing the complexity of gedmorphic lines", *Mathematical Geology*, Vol. 26, No. 1, 1994, pp. 83–97).

It has also been discovered that an inversion and reversal of featured and featureless areas reveals further information about the curves in a novel way.

It has further been discovered that dominant scales may be broken down into orthogonal components to reveal yet further information about a curve.

In a particular embodiment, the invention comprises a method for spatial and temporal analysis of nested graphical data in the form of a curve defined within the selected coordinate system representing a physical system.

The method comprises plotting the curve on a coordinate system; selecting lines having spaced apart end points defining linear scales of varying size; selecting a plurality of random starting points in the curve; positioning an end point of one of the scales at one of the starting points; positioning the other end of the linear scale on the curve remote from the starting point to define opposite end points of an included angle having an apex at the starting point; calculating the supplement to the included angle; repeating the foregoing steps for each starting point; calculating the mean supplementary angle for each scale and determining the largest mean supplementary angle and the scale associated therewith so that a critical scale may be derived. The method further includes defining orthogonal components of each scale and deriving critical scale components therefrom.

An exemplary aspect of the invention is the ability to reverse the features and featureless areas of the curve to look at the data from different perspectives. The invention allows identification of natural paths for critical scales along the features and voids of the curve.

Yet another feature of the invention is to analyze cross-sections of a flow channel, in particular, a segment of a river bottom or ocean floor for deriving physical characteristics thereof.

BRIEF DESCRIPTION OF THE DRAWINGS

FIG. 3 is a simple transect;

FIG. 4 is an inverted transect of FIG. 3;

FIGS. 5A–5C are plots of mean angle v. scale length illustrating respectively a critical scale generally and horizontal and vertical components of the simple transect of FIG. 3;

FIG. 6 is an illustration of natural paths for the largest horizontal and vertical scales of the transect of FIG. 3;

FIGS. 7A–7C are plots of mean angle v. scale length illustrating respectively a critical scale generally and horizontal and vertical components of the inverted transect of FIG. 4;

FIG. 8 is an illustration of a natural path for the inverted transect of FIG. 4;

FIG. 11 is an inversion of the transect of FIG. 10;

DESCRIPTION OF THE INVENTION

Figure 1:
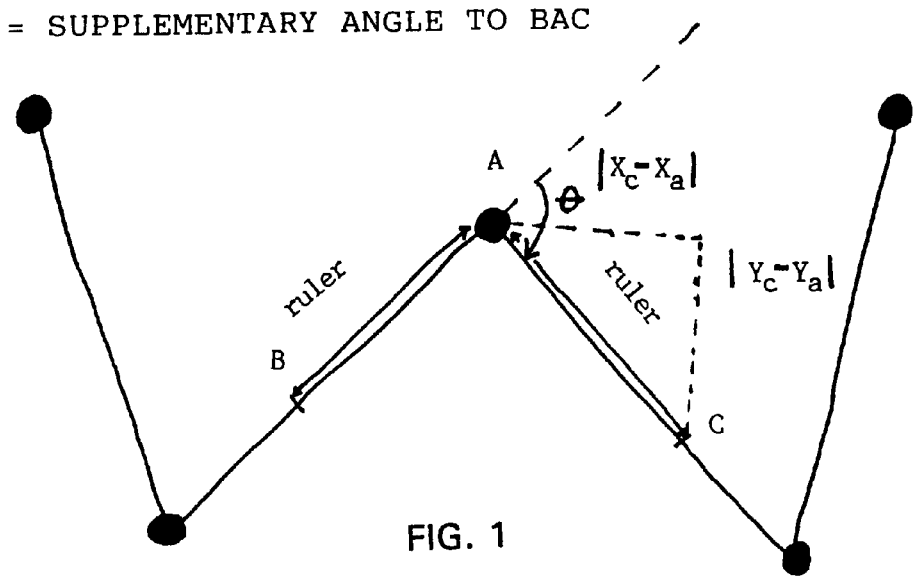
FIG. 1 is an illustration of a technique for measuring the changes in the path of a curve.
Figure 1A:
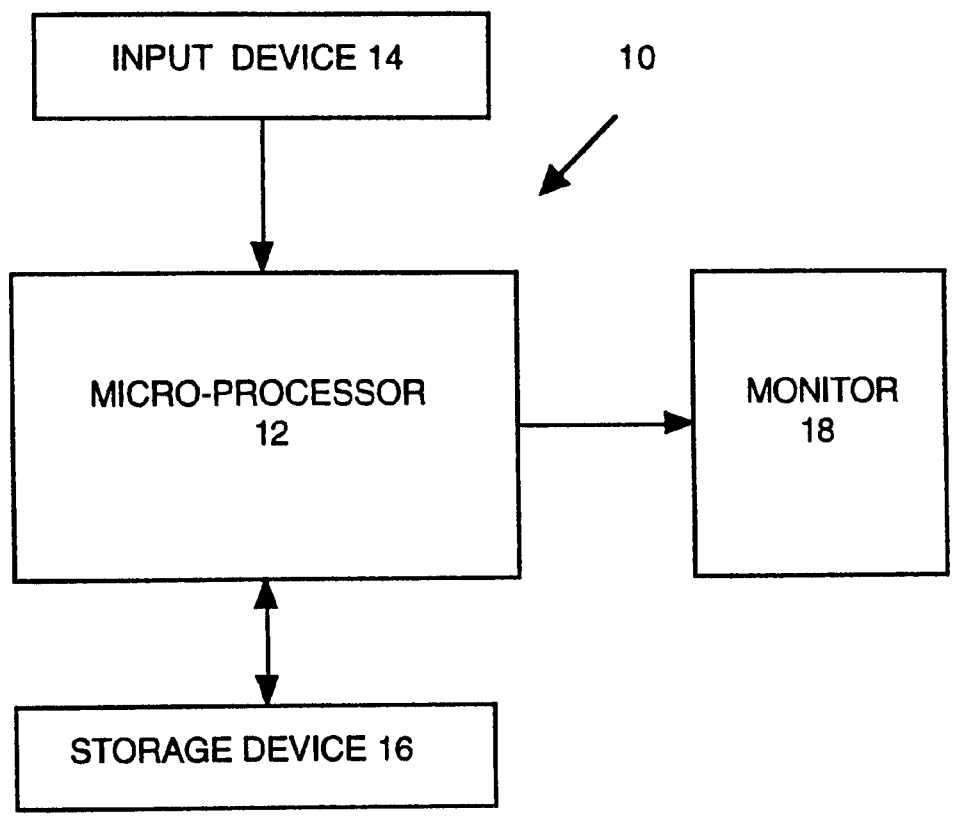
FIG. 1A is a simplified schematic block diagram of a computer for implementing the present invention.

The present invention is directed to a method for analyzing data in which a curve is digitized from a map and various scales S are used in calculating the angles representing changes in the direction of the curve. FIG. 1A is a rudimentary schematic illustration of a computer system suitable for implementing the invention. The system includes a microprocessor 12 which receives input data from an input device 14 such as a keyboard, disk drive or the like and stores the data and processed information in a storage device 16. A monitor 18 may be employed in a manner known to those skilled in the art. According to the invention, the microprocessor 12 receives input data in the form of a digitized map of a curve representing a physical object, for example, a river bottom. The microprocessor performs the method steps, processes the data and the storage device 16 stores the results of the various steps. Referring to FIG. 1, a program according to the invention randomly selects an initial starting point, from which are defined two digitized points B and C that are some selected standard ruler or scale distance, S, from A. In other words, the scale S has end points, one of which is located on the curve at A. The other load point is rotated about A so as to intersect the curve at B and C. A forms the vertex of an included angle BAC. θ=(180°—the angle BAC), thus θ is the supplementary angle to BAC. In the exemplary embodiment, this process is repeated 500 times for each scale level, for example, $S_1$–$S_n$. From this, a mean angle MA is calculated for each scale level $S1$–$S_n$. The mean angle MA and corresponding scale S values are written to a file from which a plot of MA versus log (S) may be produced.

It has been proposed that the more complex a curve is, the greater the mean angle measure. This is because the mean angle MA is a measure of the average deviation of the digitized curve from straight line at a particular scale S. Thus, a characteristic or dominant scale of the curve is the one having the greatest mean angle measure. The program of the invention is most useful for data with a nested structure and characteristic scales, because the maximum mean angle measure may be readily identified as the peak of the MA versus log (S) or MA versus scale plot.

The program according to the present invention improves the angle measurement technique by randomly selecting the starting points and by identifying the component directions associated with the mean angle. For each angle BAC, the supplementary angle θ provides a measure of the change in the path that the scale S must make to fit the curve. For example, in FIG. 1, θ is a measure of the difference in orientation of the line AC with respect to the line AB. Determining whether this change occurs more in one orthogonal direction as opposed to another, for example, the horizontal and vertical directions, provides a more complete and accurate determination of how the characteristic scale is distributed within the curve. Although the terms horizontal and vertical are used, other orthogonal coordinates may be employed. However, in physical systems the horizontal and vertical directions are often most important. The mean horizontal and vertical values result from breaking vector AC into its component vectors. The equation is derived from the coordinates in FIG. 1 to calculate the variables HORIZ and VERT are shown below.

$$\text{HORIZ} = \frac{|X_c - X_A|}{S}$$

$$\text{VERT} = \frac{|Y_c - Y_A|}{S}$$

Where

S is the scale;

A is defined by Cartesian coordinates $X_A$, $Y_A$;

C is defined by Cartesian coordinates $X_C$, $Y_C$.

Note that the vectors are scaled by a ruler length so that only a relative change in the component value is used.

It is also important to determine how one is identifying complexity and data. For example, in the curve shown in FIG. 2, one may view the data two ways. First, one may look at the data as containing voids which are like valleys, or as containing features which are like mountains.

Figure 2:
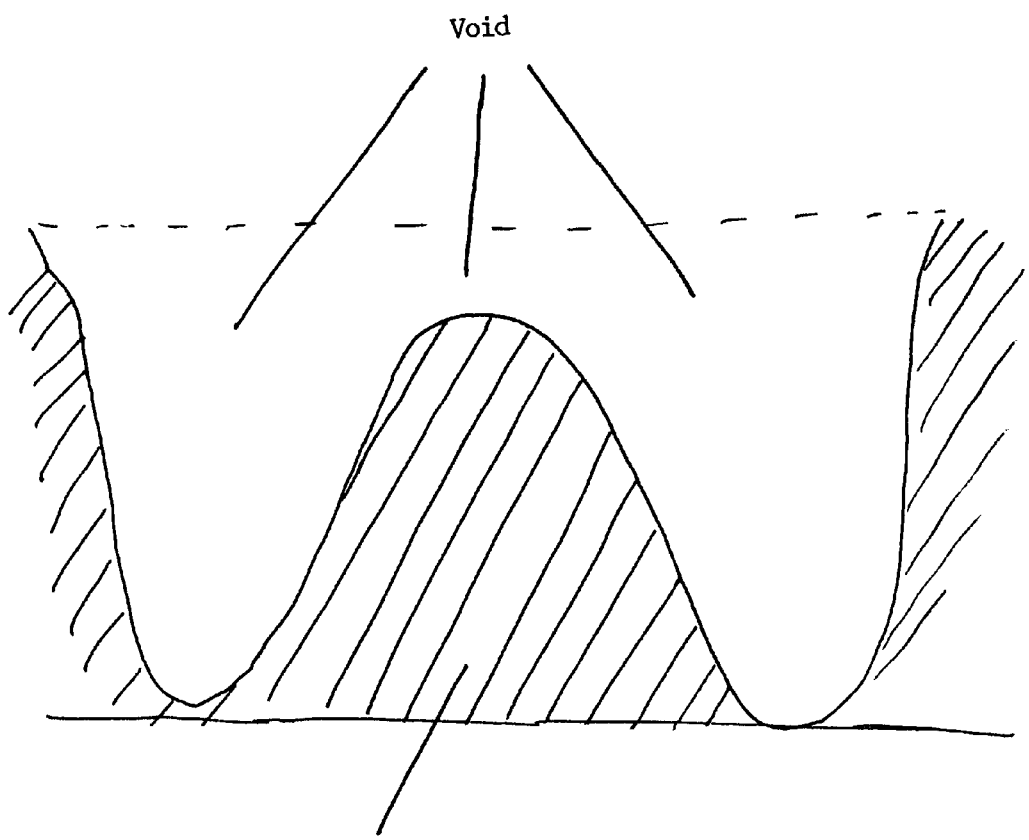
FIG. 2 is an illustration of a curve having defined void and feature areas.

In FIG. 2, the curve represents the profile of a river bottom, the dotted line is the water level and the horizontal axis represents the lowest point of the bottom. The hatched area represents a mound feature in the river bottom and the open areas or voids represent water.

Figure 2A:
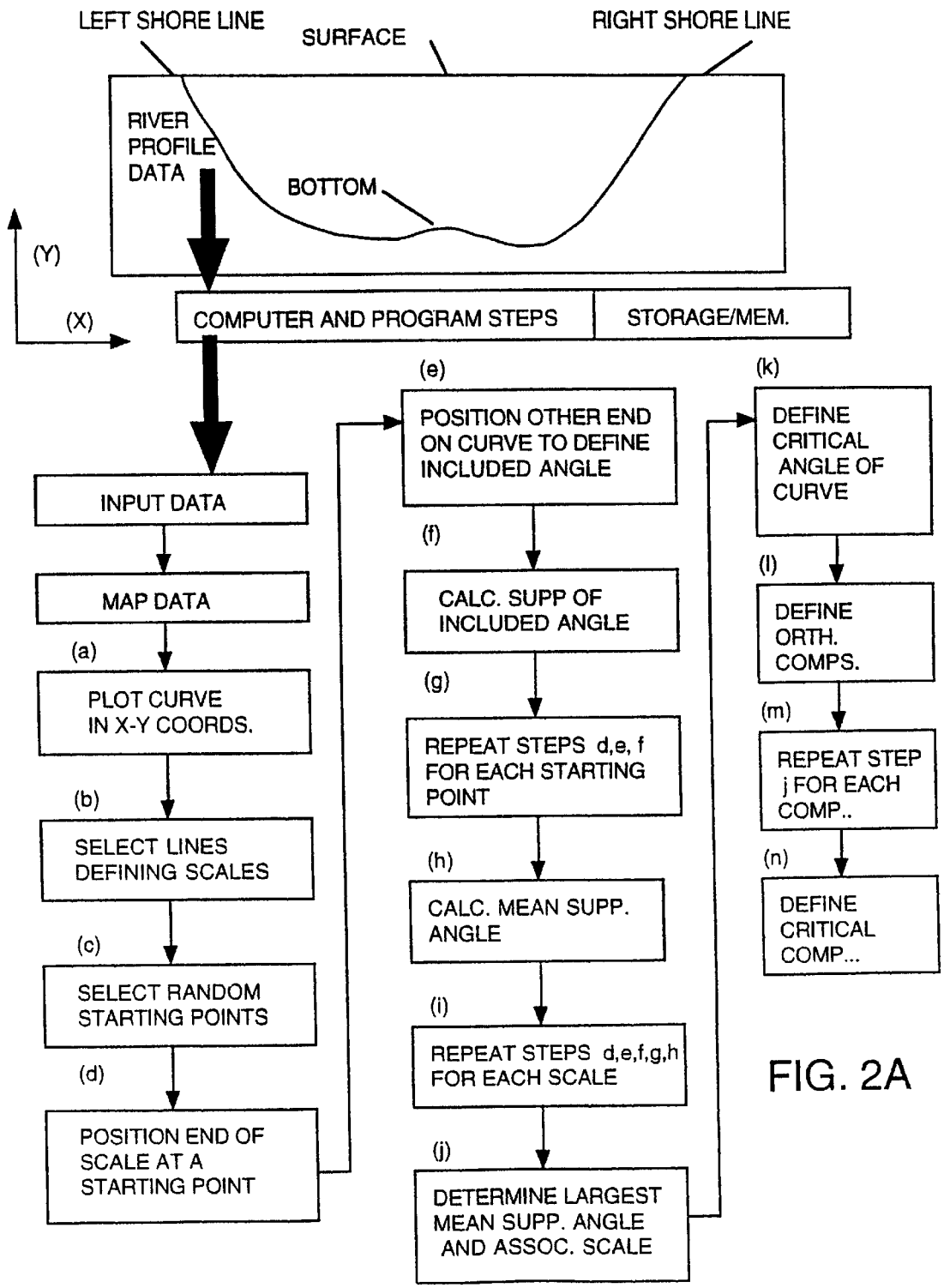
FIG. 2A is a schematic block diagram illustrating the collection of river bottom profile data and the processing thereof in a computer including a series of process steps in accordance with the present invention.

FIG. 2A illustrates a particular embodiment of the invention in which river profile data derived from measurements of the river bottom is input to a computer programmed to perform process steps in accordance with the present invention. The computer includes a storage or memory for storing the program and data. The computer performs the various process steps in order to allow for analysis of the data, which analysis allows for the prediction of characteristics of the physical system defined by or represented by the curve.

Figure 2B:
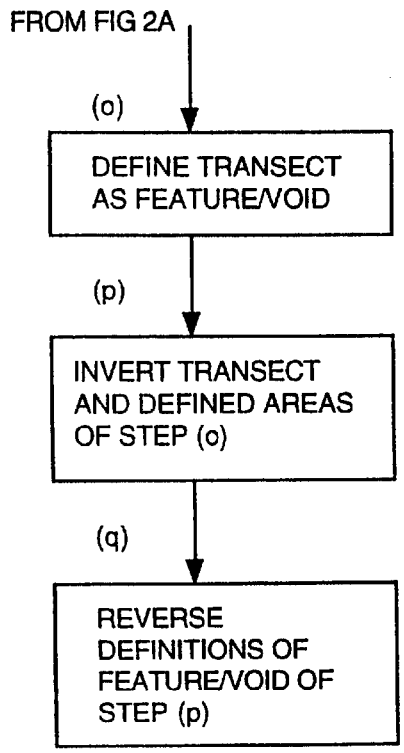
FIG. 2B illustrates in schematic block form further processed steps in the arrangement of FIG. 2A.
Figure 2C:
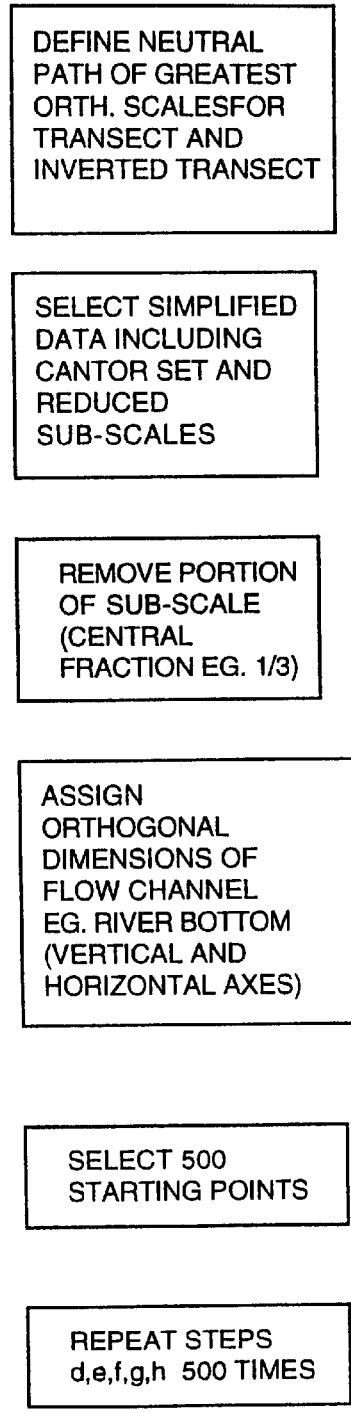
FIG. 2C illustrates additional process steps which may be separately performed in accordance with the arrangement of FIG. 2A.

The invention comprises a computer implemented method for characterizing spatial and temporal aspects of nested graphical user input data in the form of a digitized curve from a map representing a physical structure or system having endpoints defined within a selected coordinate system. The computer is capable of storing the information in a storage device and processing the information. Such processing includes performing enumerated steps and storing the results for subsequent processing in the computer. The enumerated steps comprise those shown in FIG. 2A, including inputting data to the computer, mapping the data in the computer and performing operations on the data in accordance with steps a–n. Additional steps are set forth in FIG. 2B, including steps o–q. One or more of the steps set forth in FIG. 2C may likewise be performed.

In FIG. 3, these two perspectives may be illustrated in a diagram known as simple transect or cross-section of elevation versus lateral distance. If the transect is viewed as having voids, i.e., unhatched areas, this data has potentially three significant scales, namely two (2), four (4) and six (6), related to the size of the voids in the data. If, instead, one views the data from the feature viewpoint, that is, the hatched areas, this data would be said to contain one significant scale, namely two (2), related to the size of one rectangular feature in the center of the data. The invention may be used to identify the characteristic scales relative to voids and features by applying the teachings thereof to the simple transect of FIG. 3 or to an inversion of the transect shown in FIG. 4 and described below.

An inverted transect is a curve which is an inversion of the original curve having features which were voids in the original transect and having voids which were features in the original curve. FIG. 3 is the original transect with three voids, two of which have dimensions 2×6, one of which has a dimension 2×4 and one feature that has dimension 2×2.

FIG. 4 is an inversion of FIG. 3 with one void that is 2×2, two features of 2×6 and one feature of 2×4.

The critical scale $S_c$ is the scale with the largest mean angle that will fit within the curve twice in any direction. Notice that the critical scale shown in FIG. 5A for the original transect of FIG. 3 is 6.2, while the critical scale of FIG. 7A for the inverted curve of FIG. 4 is 2. This analysis indicates that the critical scale that is calculated by the technique described herein, is more generally affected by void size than by feature size. Thus, to use the technique of the invention in viewing the transect from a feature perspective, one would apply the technique to the inverted transect whose voids are features of the actual transect. It is interesting to note that in the original transect of FIG. 3, the surface area comprises 32 square units (e.g., feet) of voids and 4 square units of features. The inverted transect of FIG. 4, by contrast, has 4 square units of voids and 32 square units of features. In this simple example, it is easy to see how important this distinction is in interpreting the data.

Figure 5C:
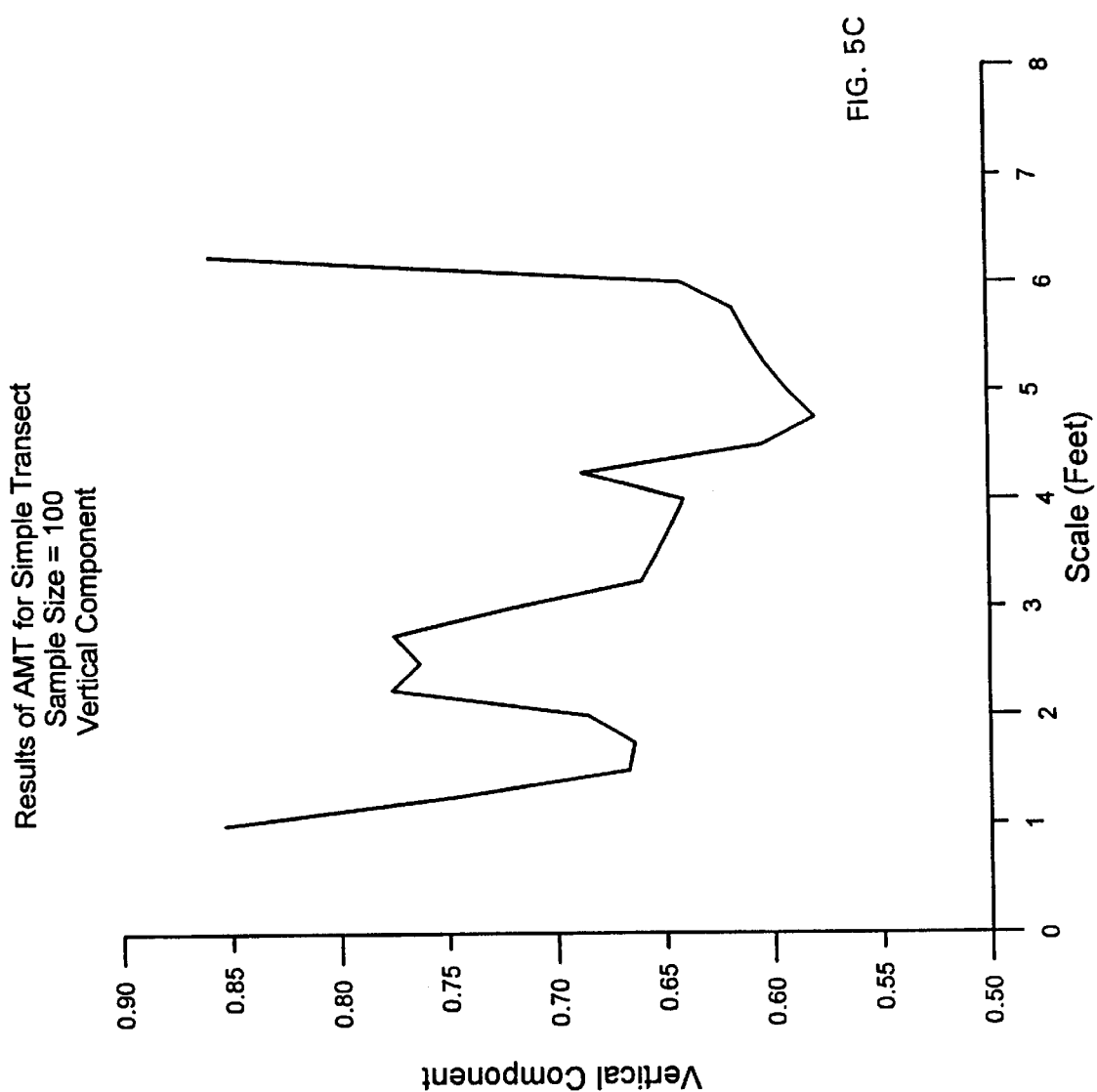

The vertical and horizontal components of the simple transect of FIG. 3 may be separately analyzed. For example, see FIGS. 5B and 5C, which represent respectively the critical vertical component and the critical horizontal component. For the original transect, the scale with maximum average vertical component is 6.2 (FIG. 5B). This is the same length as the overall critical scale (FIG. 5A) and is the largest scale that will fit twice along the curve. The scale with the greatest average horizontal component is 3.2 (FIG. 5C).

FIG. 6 represents a natural path that the critical scales each component would take in FIG. 3. The natural vertical path in $N_v$ is the chain line having a length 6.2 units and the natural horizontal path $N_h$ is the dotted line having a length 3.2.

It is not surprising that 3.2 is the scale with the largest horizontal component when looking at the natural path for a scale length of 3.2. This scale has its greatest change of path in the horizontal direction. Any scale larger than 3.6 would have a lesser average change in the horizontal component. The vertical component is more associated with voids, which are dominant in the original transect of FIG. 3, while the horizontal component is more associated with the feature in the FIG. 3 transect. Thus, by observing the magnitude of the scales and comparing the size of MA for the vertical and horizontal directions having the maximum change in each direction it is clear that the vertical characteristics are more dominant than the horizontal characteristics.

Figure 7B:
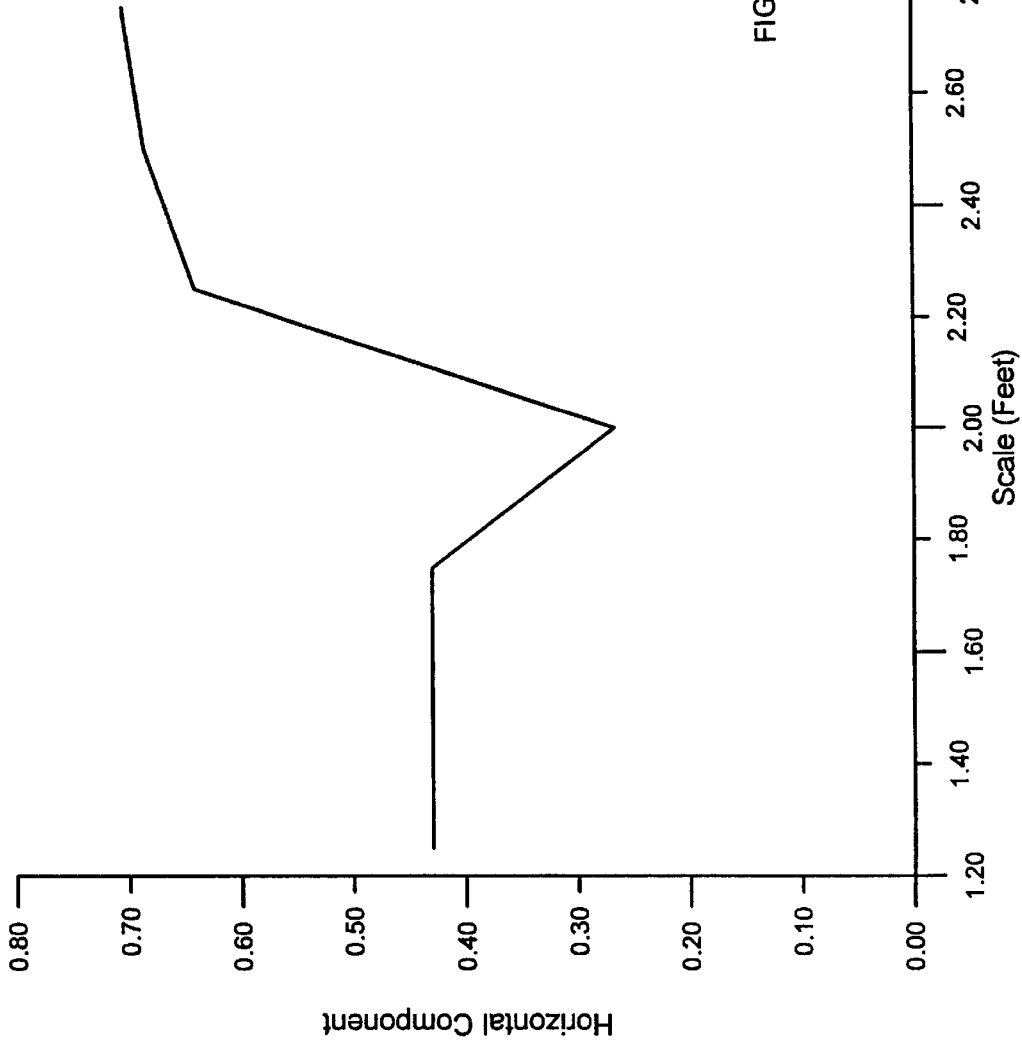

FIG. 8 illustrates a natural path that the critical scales for each component direction would take in the inverted curve. The critical scale is 2, as shown in FIG. 7A. The maximum average vertical components 1 (FIG. 7C) while the maximum average horizontal component is 2.8 (FIG. 7B). The longest scale that will fit twice in the transect has a length 3.6. This fits only if the center point, A, is positioned at the coordinates (3, 4). Since the choice of the starting point is random, the likelihood of choosing (3, 4) as a starting position, is small. Hence, the largest scale that fits from taking samples of 100 random starting points is 2.8 which corresponds to the natural path shown as a dashed line in FIG. 8.

If a larger scale had been found to fit, the scale with the largest mean horizontal component would have been 3.6, while a larger scale would have had virtually the same mean vertical component. A natural path for the critical vertical scale with length 1 is illustrated as a dotted line in FIG. 8. It is clear that any scale longer than 1 would not be able to fit twice in a strictly vertical direction, hence 1 is the critical vertical scale. It is interesting to note that 2.8 is the precise length of the diagonal of the void in the transect. This further substantiates the view that the characteristic scale and components are affected mostly by voids, rather than the features of the curve.

Current methods do not consider the different ways of viewing data, from the perspectives of voids or features, nor do such methods provide a means of doing so. For different applications, such as hydraulic flow or signal processing, this concept is crucial. In flow studies, the voids are more significant because their size affects the velocity of hydraulic action. In signal processing studies, one is interested in the features, for they identify an event, while the voids are virtually of no interest at all.

The transect may be measured with a variety of rulers to measure perimeter change by scale change. As fractal dimension based algorithms do, such a technique simply identifies the frequency and magnitude of both voids and features without any distinction or means of identifying which scales constructing these characteristics are more significant. Prior techniques identify the scale at which most of the complexity occurs, but do not identify whether it is largely due to voids or features. The present invention substantially improves the prior methods by making this distinction and allowing the user to determine whether to analyze the voids or the features, or both.

The present invention is a process that involves several steps. First, angle measurements are used to determine the characteristic scale or scales. Then these scales are used to measure the length of the curve, and a measure of the error that each scale makes in measuring the cross-section is used to determine where the scales exist or fail to exist. Also, a Mandelbrot-Richardson plot will be generated along a range of scales where perimeter change by scale should be fairly linear as viewed on a logarithmic plot. The results can be extended to three dimensions by using multiple data sets having slices corresponding to different Z coordinate values and interpolating between the slices to see where the scale is dominant along the surface. The last step is to use post processing programs to generate plots reflecting the output of the measurement and angle techniques.

Figure 9:
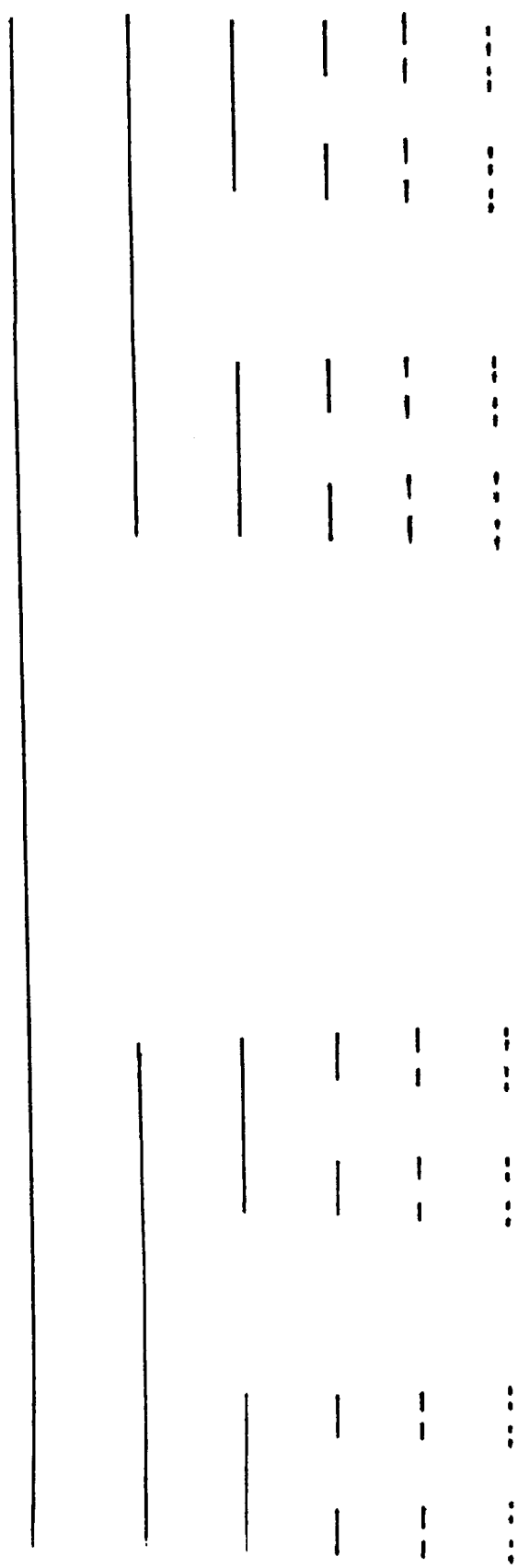
FIG. 9 is an illustration of a Cantor set.
Figure 10:
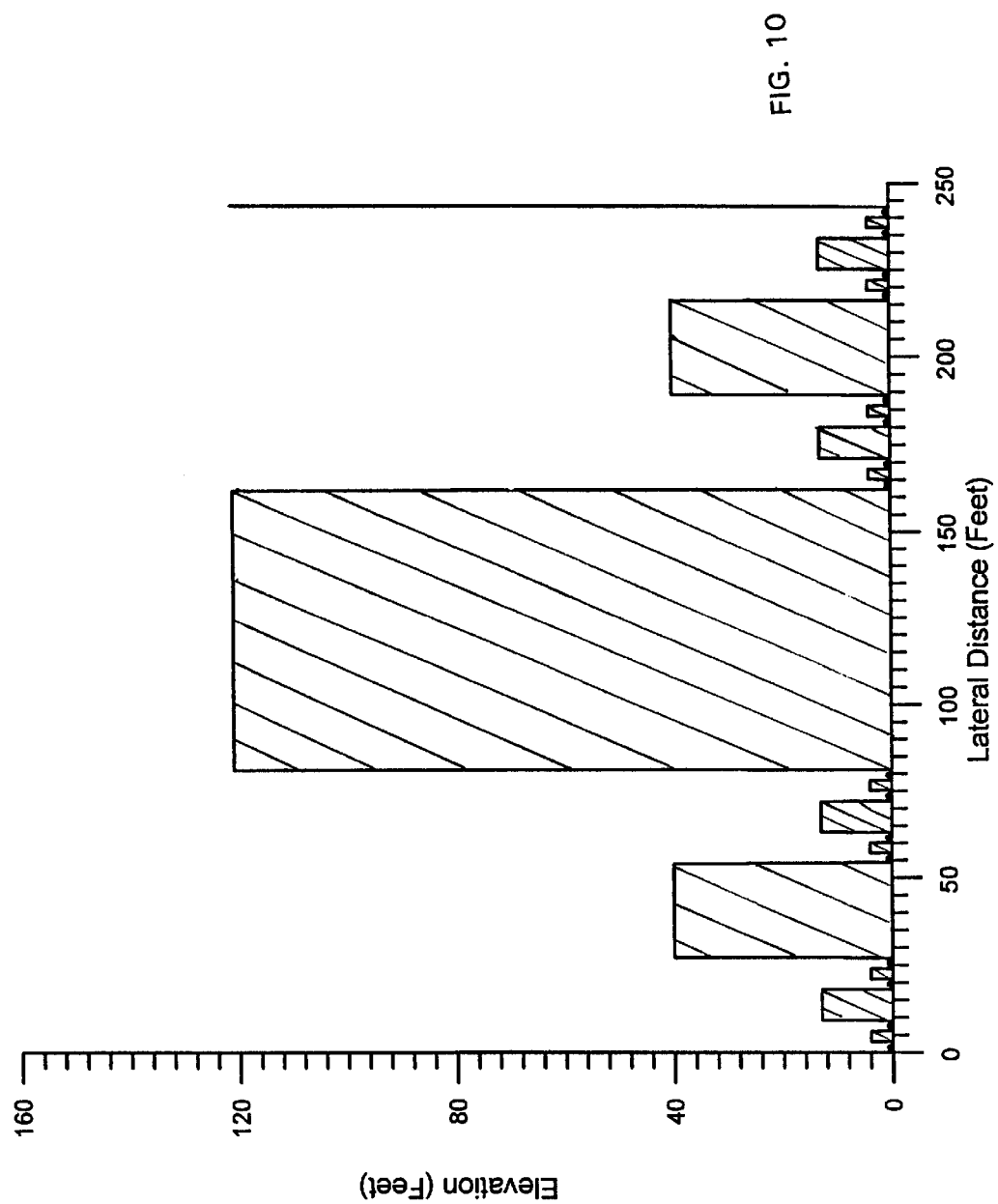
FIG. 10 is a Cantor set transect.
Figure 12A:
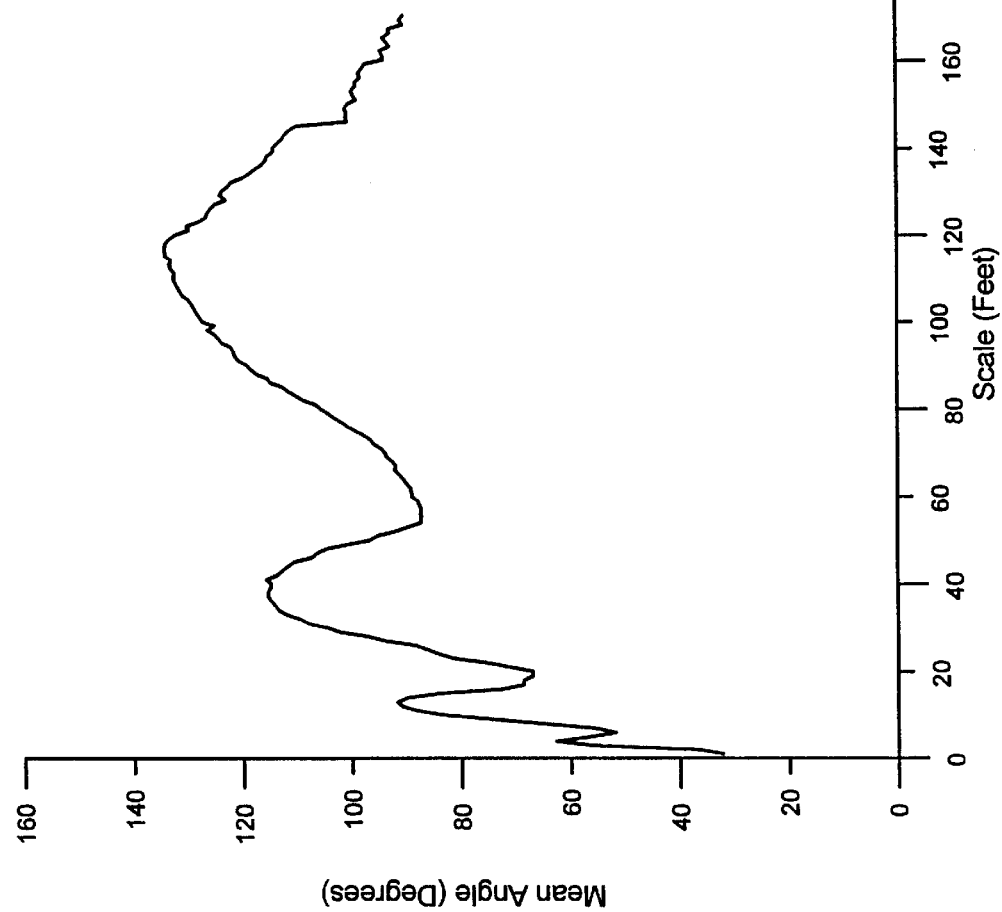
FIGS. 12A–12C are plots of mean angle v. scale length illustrating respectively a critical scale generally and horizontal and vertical components of the Cantor transect of FIG. 10.
Figure 12B:
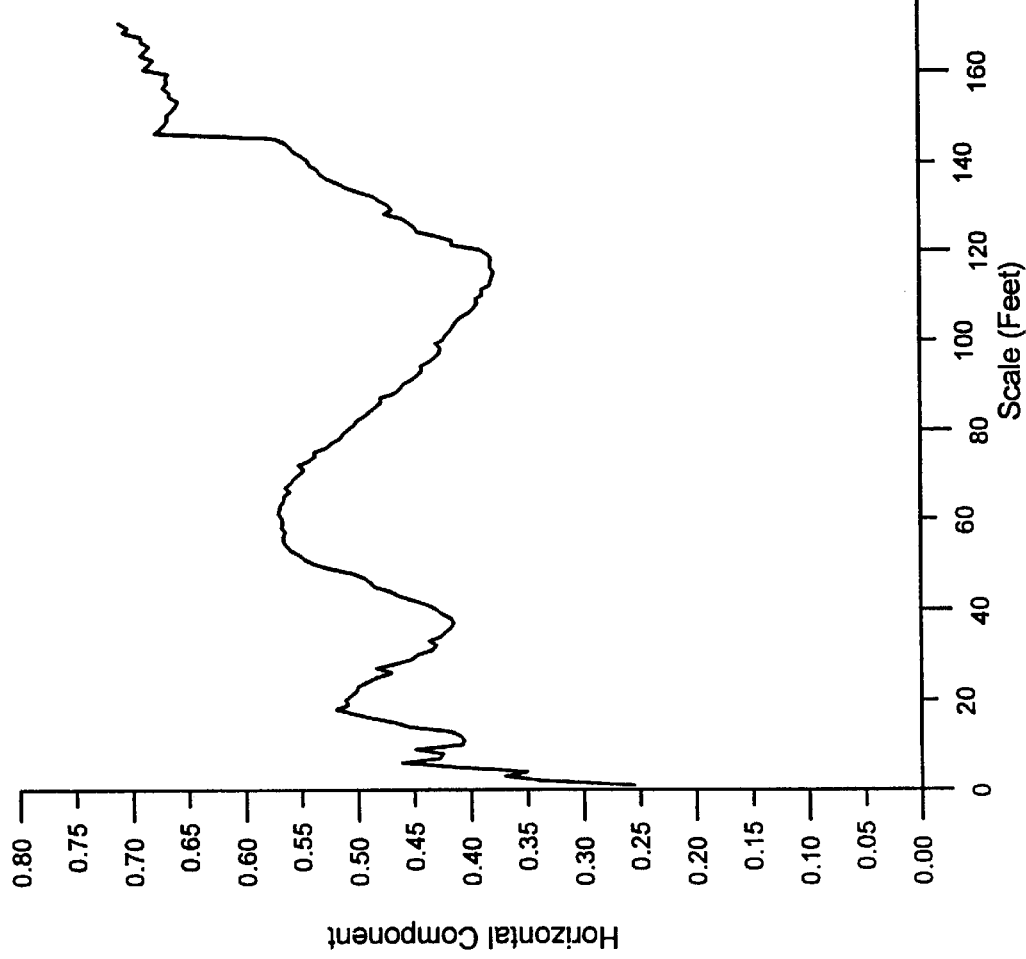
Figure 12C:
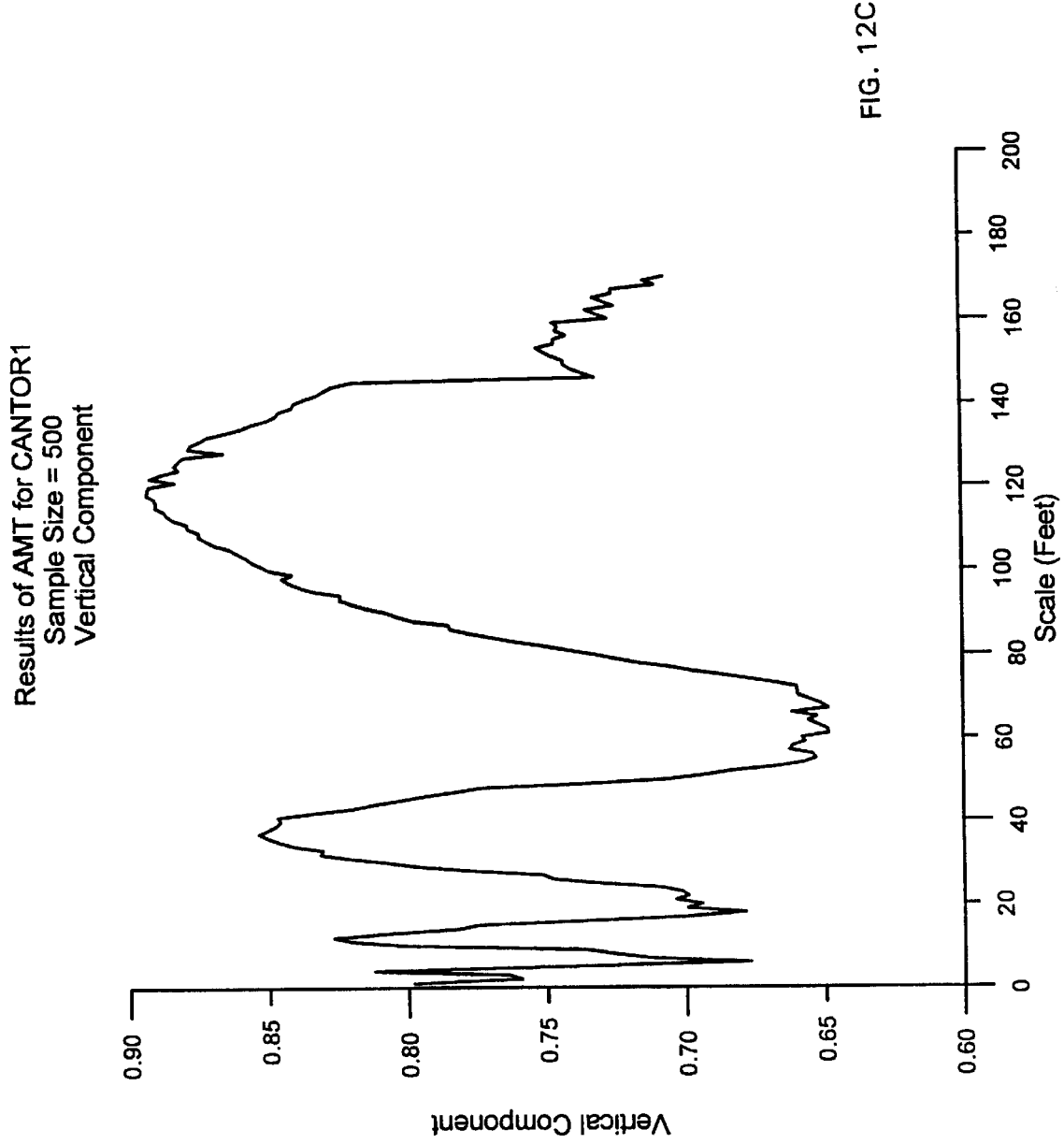
Figure 13A:
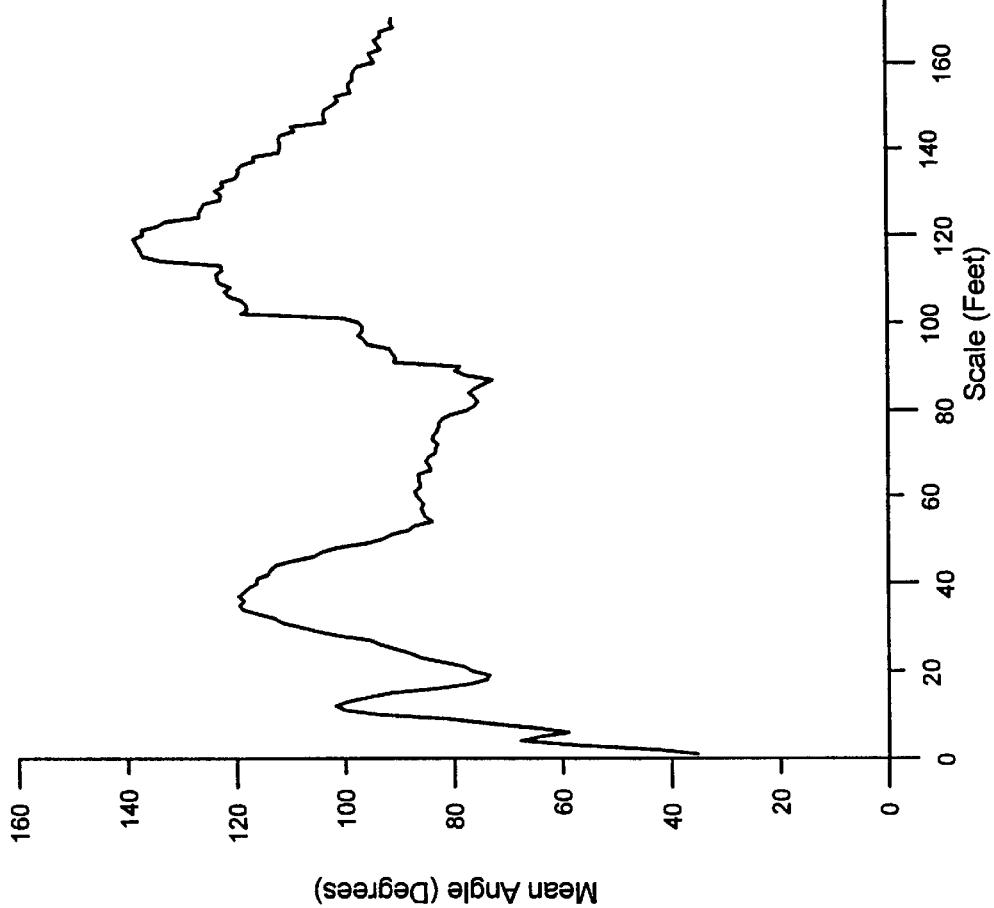
FIGS. 13A–13C are plots of mean angle v. scale length illustrating respectively a critical scale generally and horizontal and vertical components of the inverted Cantor set of FIG. 11.
Figure 13B:
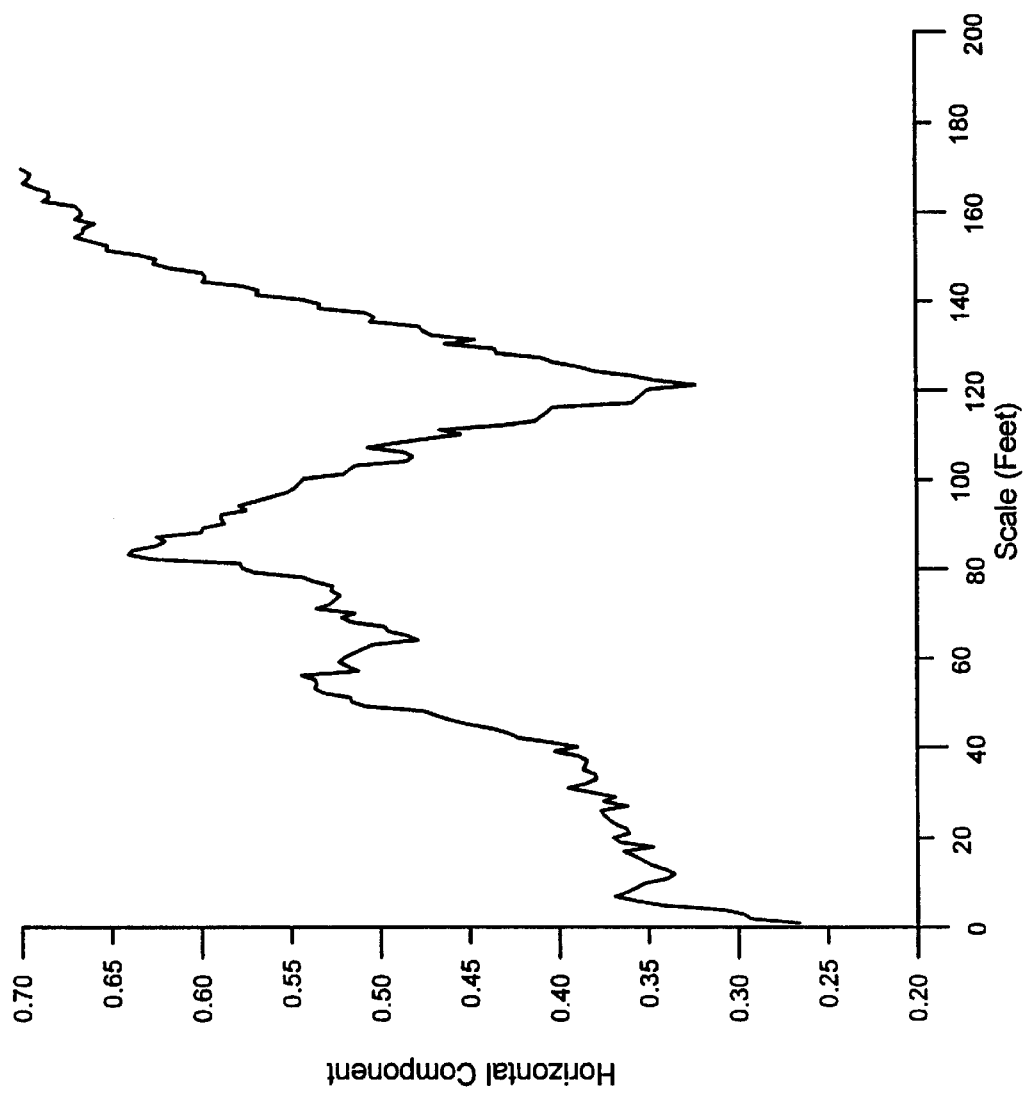
Figure 13C:
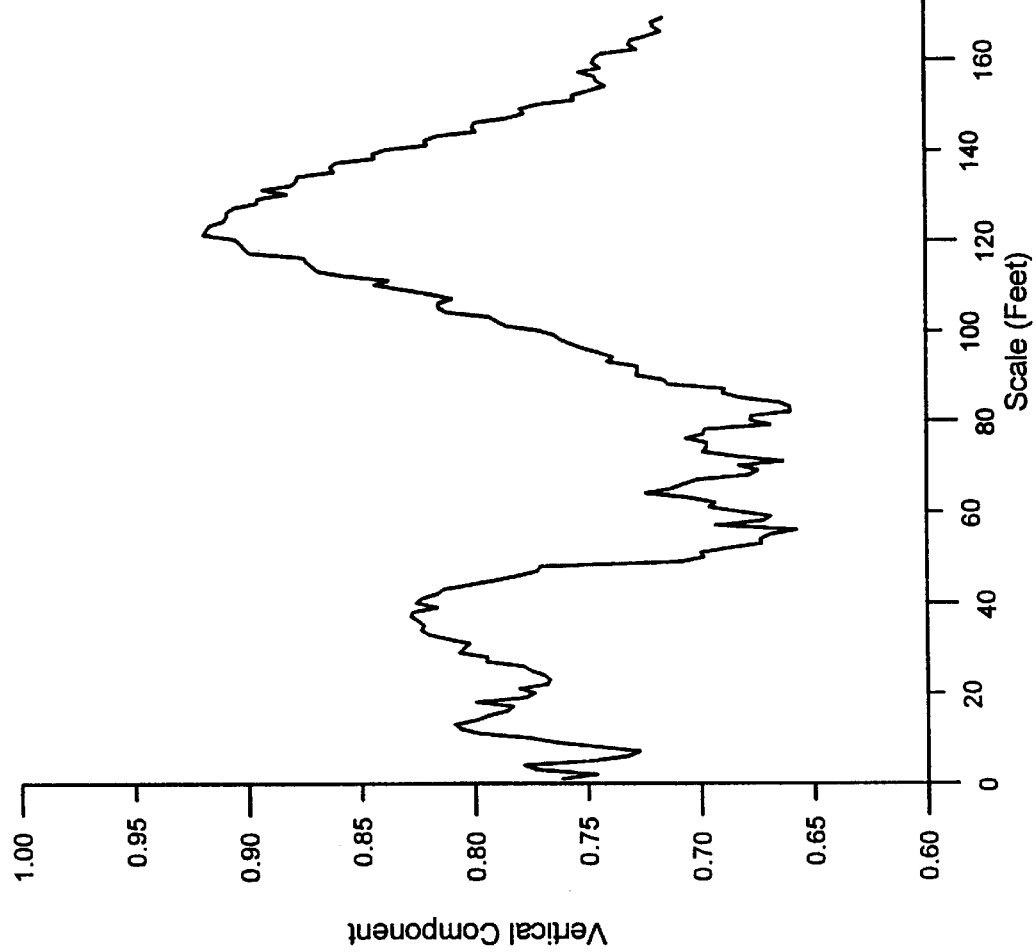

The usefulness of the present invention may be illustrated by applying the approach to a transect based upon a so-called Cantor set. The Cantor set is a mathematical construct illustrated in FIG. 9 in which the interval of unit length has a middle fractional portion, e.g., third, removed at each step of the process. The Cantor set is used to construct a transect from which a reasonable determination may be made of what results are expected. In the Cantor set of FIG. 9, the middle third was kept at the current Y coordinate, while the other two had Y coordinates set to zero. The current Y coordinate is the sum of increasing powers of three. The three segments are connected with vertical lines. That is, at the first step, an interval of 243 feet is broken into subsets from 81 to 162 at Y=121=(1+3+9+27+81), while the outer segments are from 0 to 81 and 162 to 243 at Y=0. The process is continued five times on the outer two segments, and the resulting transect is shown in FIG. 10. FIG. 11 is the inverted Cantor transect. The invention is applied to both the transect and its inverted version. Plots for the transect of FIGS. 10 are shown in FIGS. 12A–12C. The plots for the inverted transect of FIG. 11 are shown in FIGS. 13A–13C. Notice that unlike the simple example, both the Cantor transect and its inverted transect have virtually the same critical or significant scales. This is largely due to the fact that the void area does not change much when the transect is inverted, unlike the simple example.

The significant scales are more affected by the vertical scales that are dominant in the transect, 1, 4, 13, 40, and 121. These scales are the maximum height of each void in increasing order. As expected, the characteristic scale is approximately 121 for each transect, the height of the largest void. Thus, the invention helps to identify the nesting structure as evolving from powers of three which is not apparent by merely identifying fractal dimension as $$1.26 = \frac{\ln 4}{\ln 3}.$$

The invention has many advantages over previous systems for quantifying fractal and scale properties from natural objects. The chief benefit is that it uses several methods, both numerically and graphically to represent scale properties in irregular curves. It is superior to known techniques which either do not consider the fractal properties of the data or do not consider the average component change. The invention quantifies the curve at a variety of scales in addition to calculating the fractal dimension.

The invention also improves on the measuring algorithm used in known systems because it incorporates the statistical concept of sum of squared error in choosing the best intersection. This is an important improvement in determining paths for scales across a curve. Despite the fact that perimeter data may be dependent upon the starting position, some prior art measuring methods use only the first or last data point as the starting position. Thus, the results are biased by the choice of the starting point. The present invention calculates the perimeter and fractal dimension from multiple randomly chosen starting points. Thus, the bias is virtually eliminated. The invention also goes beyond a single number, such as a fractal dimension, by creating many types of plots to identify and describe the characteristics of complex shapes. Such plots can show where the scales may fit the data particularly well or poorly, how the variance grows with the scale and how much complexity in the data is due to horizontal or vertical factors. Thus, the present invention is more useful than the prior techniques of angle measuring which simply identifies a characteristic scale without showing why the scale is significant.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed is:

1. A computer implemented method for characterizing spatial and temporal aspects of nested graphical user input data in the form of a digitized curve from a map representing a physical structure having end points defined within a selected coordinate system, the computer being capable of storing information in a storage device and processing said information comprising the steps of:

I. performing enumerated steps: and
   II. storing the results for subsequent processing; said enumerated steps comprising,
      a. plotting the curve in the coordinate system;
      b. selecting ruler lines having spaced apart end points defining linear scales of varying size;
      c. selecting a plurality of random starting points anywhere in the curve defined between said end points;
      d. positioning an end point of one of said scales at one of said starting points;
      e. positioning the other end point of the scale on the curve remote from the starting point to define opposite end points of an included angle having an apex at the starting point;
      f. calculating the supplement to the included angle;
      g. repeating steps d, e and f for each starting point;
      h. calculating the mean supplementary angle;
      i. repeating steps d, e, f, g and h for each scale;
      j. determining the largest mean supplementary angle and the scale associated wherewith;
      k. defining the scale having the largest mean supplementary angle as the critical scale of said curve;
      l. defining orthogonal components of each scale;
      m. repeating step j for each component; and
      n. defining the component having the largest mean supplementary angle as the critical component of said curve.

2. The method of claim 1, said enumerated steps further comprising:
   o. defining a transect having areas on opposite sides of the curve as one of features and voids.

3. The method of claim 2, said enumerated steps further comprising:
   p. inverting the transect of step o and the defined areas thereof;
   q. reversing the definitions of features and voids of the inverted transect of step p.

4. The method of claim 3, said enumerated steps further comprising defining a natural path of greatest orthogonal scales applicable to the transect and the inverted transect.

5. The method of claim 1, said enumerated steps further comprising selecting simplified data for performing the method under controlled conditions as a check for the model.

6. The method of claim 5 wherein selecting the data comprises selecting the scale; and defining a Cantor set of scales relative thereto which Cantor set comprises subscales of the scale, each subscale being reduced so as to have a portion thereof removed.

7. The method of claim 6 wherein the portion removed is a central fraction.

8. The method of claim 7 wherein the portion removed is a central third.

9. The method of claim 6, said enumerated steps further comprising assigning orthogonal dimensions to the Cantor set.

10. The method of claim 1 wherein the data comprises cross-sectional elements of a portion of a flow channel.

11. The method of claim 10 wherein the flow channel comprises a river bottom.

12. The method of claim 1 wherein the orthogonal directions are vertical and horizontal directions.

13. The method of claim 1 wherein the orthogonal directions are horizontal, vertical and axial directions.

14. The method of claim 1 wherein the number of starting points is about 500.

15. The method of claim 1 wherein repeating steps d, e, f, g and h occurs 500 times for each scale.

* * * * *